May 28, 1957  L. P. EVANS  2,793,915
LIFT POT AND METHOD OF CONTACTING LIFT GAS WITH
GRANULAR SOLID PARTICLES
Filed April 26, 1956  2 Sheets-Sheet 2

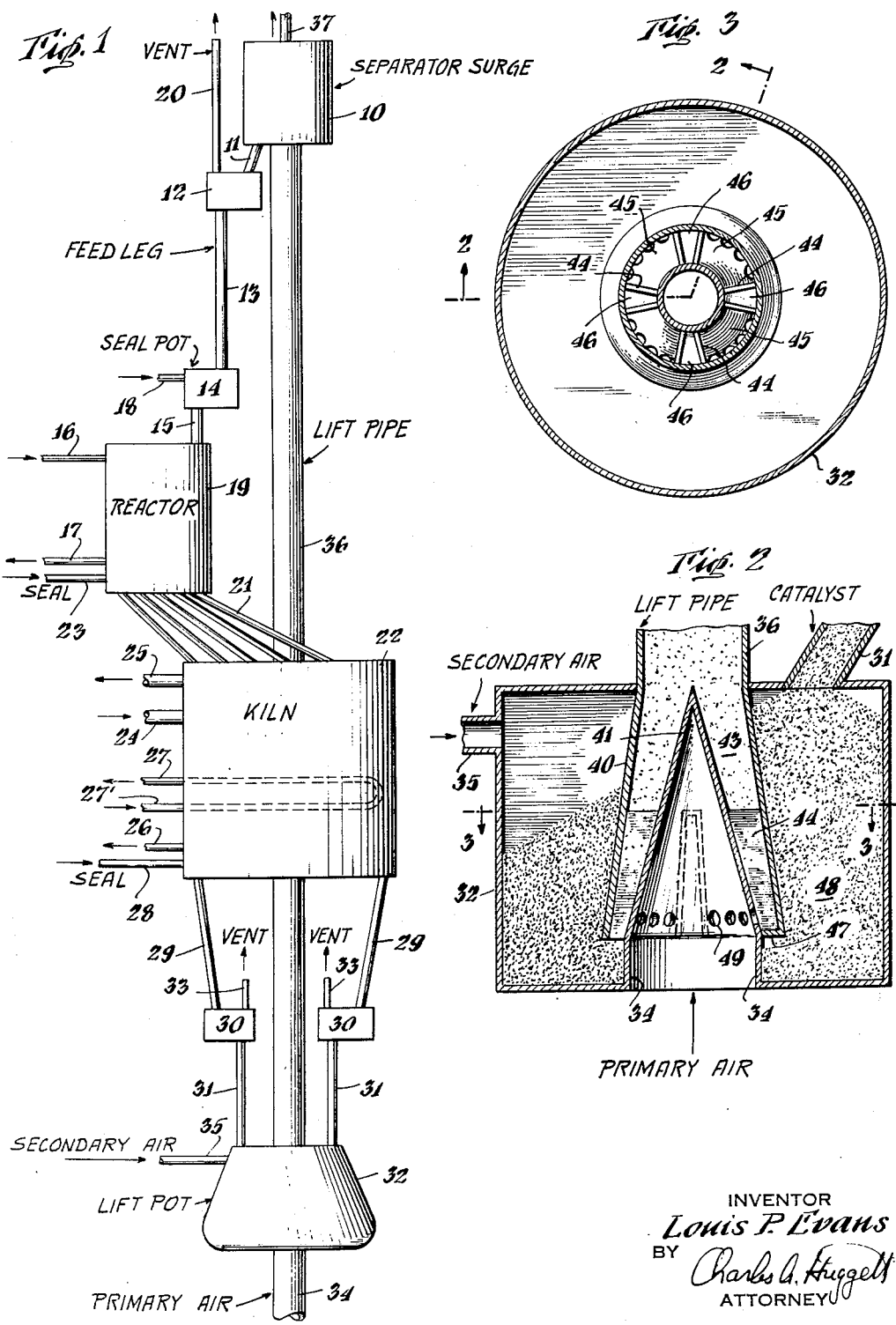

INVENTOR
Louis P. Evans
BY Charles A. Huggett
ATTORNEY

United States Patent Office 2,793,915
Patented May 28, 1957

2,793,915

LIFT POT AND METHOD OF CONTACTING LIFT GAS WITH GRANULAR SOLID PARTICLES

Louis P. Evans, Woodbury, N. J., assignor to Socony Mobil Oil Company, Inc., a corporation of New York Application April 26, 1956, Serial No. 580,922

6 Claims. (Cl. 302—53)

This application relates to an improvement in a pneumatic lift for elevating granular particle form contact material in a circulating system. It particularly relates to an improvement in the feeding of granular contact material to the lower end of an upwardly-extending pneumatic lift used to elevate granular contact material in moving bed hydrocarbon conversion systems.

The moving bed hydrocarbon conversion system has been used extensively for cracking, treating and reforming hydrocarbons to provide superior products for use primarily as motor fuel. In these processes, such as the TCC process, the granular contact material is gravitated continuously as a compact stream downwardly through a reaction zone at an elevated temperature and pressure where it is contacted with the reactants, and downwardly as a compact stream through a regeneration zone where the spent contact material is regenerated by burning contaminants from the surface of the contact material in the presence of air. The regenerated catalyst must be elevated for its return to the top of the reaction zone and although elevators have been used for this purpose, pneumatic lifts are now commonly employed to elevate the granular contact material in a stream of rapidly moving lift gas.

Since the gases or vapors in the moving bed conversion process are passed or blown through the mass of catalyst, it is desirable that the granular particles retain sufficient size so that the voids in the bed are sufficient to provide easy flow of the vapors or gases through the bed. It is, therefore, essential that attrition or breakage of the granular particles to fine particles or fines be minimized. If fines are produced in the process, they must be removed to keep the pressure drop across the beds at a minimum value and to prevent other undesirable incidents. These pneumatic lifts comprise essentially an upwardly-extended lift pipe open at both ends with the lower end terminated intermediate the top and bottom of the lift pot, and the upper end terminated intermediate the top and bottom of a gas-solids separator. These lifts have functioned well in the TCC system with reasonably low levels of attrition. However, it has been noticed that some attrition does occur at the lower end of the lift where the gas and solids first come into contact with each other and that some erosion of the lift pipe occurs in the lower end of the pipe. Once the particles are uniformly distributed within the pipe and assume reasonably high levels of velocity, substantially no attrition occurs and erosion of the pipe is very low.

The object of this invention is to provide an improved method and apparatus for engaging the granular contact material with lift gas at the lower end of the pneumatic lift pipe.

A further object of this invention is to provide improved method and apparatus for engaging granular contact material with a lift gas for subsequent transfer through a lift pipe which provides minimum attrition of the contact material and minimum erosion of the lift pipe.

A further object of this invention is to provide in a moving bed hydrocarbon conversion system utilizing a pneumatic lift for elevating the granular contact material, an improved method and apparatus for engaging the contact material with the lift gas which provides minimum attrition of the contact material and minimum erosion of the lift pipe. These and other objects of the invention will be clarified in the subsequent discussion of this invention, which discussion relates to the following drawings:

Figure 1 shows diagrammatically a complete moving bed hydrocarbon conversion system which utilizes a pneumatic lift for elevating the granular contact material;

Figure 2 shows, in vertical section, a lift pot for engaging the granular contact material with the pneumatic transfer gas;

Figure 3 shows, in horizontal section, a portion of the lift pot of Figure 2 as seen through plane 3—3;

Figure 5:
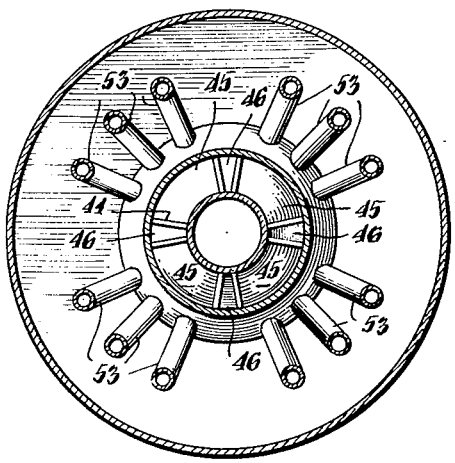
Figure 5 shows a horizontal sectional view of the lift pot of Figure 4.

At least one embodiment of this invention comprises a lift pot with a lift pipe terminated at its lower end intermediate the top and bottom of the lift pot, said lift pipe extending outwardly at its lower end and having an annular passage formed at its lower end of gradually increasing radial thickness from bottom to top. Within the annular passage is suitably located vertical and radial partitions forming passageways which alternately connect at their lower ends with the bed of contact material and a source of primary lift gas. The granular particles in this lift pot are urged into the alternate passageways by means of secondary gas, which gas comprises only a small portion of the total lift gas, and the particles are accelerated and directed in these passageways with minimum attrition and erosion before the particles contact the bulk of the lift gas.

The invention will now be disclosed in more detail by noting its application to a moving bed cracking process, such as the TCC process. Referring first to Figure 1, granular catalyst collected in the bottom of the separator surge vessel 10 gravitates as a compact mass through the connecting conduit 11 into a gas separator pot 12 and downwardly through an elongated gravity feed leg 13 into a seal pot 14 and through connecting conduit 15 into the top of the reactor 19. Hydrocarbons, properly prepared for conversion, are introduced into the reactor through the conduit 16 and passed downwardly in concurrent flow with a bed of the granular contact material to be withdrawn from the bottom of the reactor to the conduit 17. The pressure in the reactor is generally maintained advanced at a pressure of about 10–15 pounds per square inch gauge. The pressure in the separator is generally at or about atmospheric and since there is open communication between the separator and the reactor, means for sealing the reactor are provided. The feed leg 13 is made long enough so that the catalyst will flow smoothly as a gravity stream against the advanced pressure in the reactor. In addition, an inert gas, such as steam or flue gas, is introduced through the conduit 18 into the seal pot 14 at a pressure just slightly above that in the reactor. The gas, therefore, flows to a minor extent downwardly into the reactor 19 but most of it flows upwardly through the feed leg 13 to the disengaging zone 12 and then through the vent line 20 to be discharged to the atmosphere. This combination of seal leg and seal gas effectively prevents the escape of reactants from their selected path in the reactor 19. The reactor is maintained at a temperature of about 800–1000° F., which is found suitable for the cracking reaction. For other processes, of course, other pressures and temperatures may be found more desirable. Reaction occurs as the hydrocarbon vapors travel downwardly through the voids in the catalyst bed, and the heavy oils are cracked to form increased amounts of material boiling in the gasoline boiling range. As the cracking proceeds, a carbonaceous deposit is located on and within the catalyst. The spent catalyst is withdrawn from the bottom of the reactor through the conduits 21 still as a compact gravitating stream and introduced onto the top of a gravitating bed of catalyst in the regenerator or kiln 22. A seal gas, such as steam or flue gas, is introduced into the bottom of the reactor through conduit 23 to prevent reactants from travelling downwardly with the catalyst into the kiln and to purge the catalyst of reactant materials or reaction products.

Air, at a pressure not substantially greater than atmospheric, is introduced into the kiln through the conduit 24 and travels through the bed of catalyst in the kiln to effectively burn the contaminants from the catalyst. Flue gas formed by this burning is removed from the kiln through the conduits 25 and 26 and discharged to the atmosphere. A circulating cooling medium may be passed through conduits 27, 27' within the kiln to prevent the catalyst temperature from rising too high. Alternatively, these heat exchanger tubes or coolers may be located at other locations in the system, the main requirement being that the entire system be maintained within proper heat balance and that excess catalyst temperatures be avoided. A seal gas may be introduced into the bottom of the kiln through the conduit 28. Catalyst is withdrawn from the bottom of the kiln through the conduits 29 to vent chambers 30 and downwardly through the conduits 31 into the top of the lift pot 32.

Since the gas pressure of the lift pot is about atmospheric, the conduits 31 serve as feed legs to prevent the escape of substantial amounts of gas from the lift pot. A small amount of gas will escape from the lift pot up through the conduits 31 to the vent boxes 30 and from the vent boxes to the atmosphere through the conduits 33. A suitable lift gas is introduced into the lift pot 32 through the primary gas pipe 34 and also through the secondary gas pipe 35. This gas contacts the contact material and lifts it through the lift pipe 36 to the separator 10. The solids and gas are separated in the separator 10 and the gas is discharged through the pipe 37 at the top of the separator with the solids collecting on the floor of separator 10 for return to the gravitating system.

The important details of this invention are disclosed more particularly with respect to Figures 2 and 3, which show one embodiment of the improved lift pot or lift gas-solids engaging method. The lift pot is shown as a cylindrical tank 32 with the lift pipe 36 terminated at its lower end within the vessel. The lower end of the lift pipe has a secondary flared section 40 and the primary air pipe 34 terminates in a conical cap 41, which is concentric with the lift pipe and projected upwardly into the lower end of the lift pipe at about the same level of the flared lower end of the pipe. This arrangement provides a passageway of annular horizontal cross-section at the lower end of the lift pipe, the passageway having a radial thickness reasonably small at its lower end and gradually increasing from bottom to top until the passageway merges with the full cross-section of the lift pipe. The conical member 41 has a fairly small apex angle so that the passageway 43 formed between the cone 41 and the flared inlet 40, while being inwardly and upwardly directed, is so directed at a fairly steep vertical angle. Vertical and radial baffles 44 are located about the annular passageway 43 starting at a level about the lower end of the passageway 43 and terminating at an intermediate level in the passageway. These baffles may conveniently terminate at about the mid-point of the height of the passageway 43. Catalyst is introduced into the top of the lift pot 32 through the conduit 31 forming a bed of contact material about the lower end of the flared inlet 40. The vertical baffles 44 divide the annular passageway into alternate conduits 45 and 46, as shown particularly on Figure 3. The lower ends of the conduits 45 are blanked off by the flat members 47 and hence, do not communicate at the lower end with the catalyst bed 48 in the lift pot 32. The lower ends of the conduits 46, however, are in open communication with the catalyst bed 48 and gas introduced as secondary air through the conduit 35 travels through the bed 48 in the lift pot 32 pushing catalyst upwardly into the alternate conduits 45. Primary gas is introduced into the lift pot through the pipe 34 to enter the region inside the cone 41. This gas exits from the cone through the apertures 49 at the lower end of the cone, which apertures communicate with the alternate conduits 46. The gas travels upwardly through these conduits and discharges from the upper end thereof. The major portion of the gas is introduced as primary gas with only a minor portion passing downwardly through the bed 48 as secondary gas. Since only a small portion of the total gas flow is used as secondary gas, the catalyst enters the alternate conduits 45 at a reasonably low speed and commences to accelerate in these passageways at a level at which the lateral thickness of the passageways is reasonably small. The passageway is of narrow radial thickness, so that directional control to the slowly moving catalyst may be provided and, therefore, provides this control at a time when the catalyst is moving slowly enough to prevent substantial damage either to the catalyst or other metal. At the upper end of the conduits 46, the rising catalyst and secondary gas stream contacts the alternate streams of primary gas discharged from the conduits 45 and the catalyst is accelerated rapidly and passed through the lift pipe. At the point where the primary and secondary streams merge, both streams are moving in the same direction and the catalyst in the secondary stream is also moving in the same direction. There is, therefore, little tendency for the catalyst to whip about causing attrition damage as it is accelerated. There is also little tendency for the catalyst to be hurled against the wall of the lift pipe and hence, little tendency for erosion of the metal at the lower end of the pipe. By introducing the catalyst as small separated streams into the lift gas, the uniformity or mixture of the catalyst with the mixed gas at the lower end of the lift pipe is improved. This is one of the important features of this invention. Also, it is important that the radial thickness of the passageway at its lower end is small enough in lateral thickness to provide adequate control of the particles as they enter. The particles are made to flow smoothly about the lower end of the enlarged inlet to the lift pipe and up into the annular passageway. It is highly desirable that the passageway have a fairly steep attitude with respect to the horizontal. For example, the passageway extending downwardly and laterally from the base of the lift pipe should form an angle with the horizontal of about 70–80 degrees.

While the velocity of the upwardly moving primary gas at the point where it contacts the upwardly moving stream of secondary gas and solid particles must be somewhat higher than the upward velocity of the secondary gas at that point, it cannot be too much higher to avoid undesirable mixing problems. It has been found that the primary gas velocity for best results should be about 10–25% greater than the secondary gas velocity at discharge from the secondary gas passages. Appropriate control of the relative gas velocities can be obtained by suitable location of the vertical and radial baffles. By increasing the cross-section of the primary passages relative to the secondary passages, the primary gas velocity is decreased and the secondary gas velocity is increased.

Figure 4:
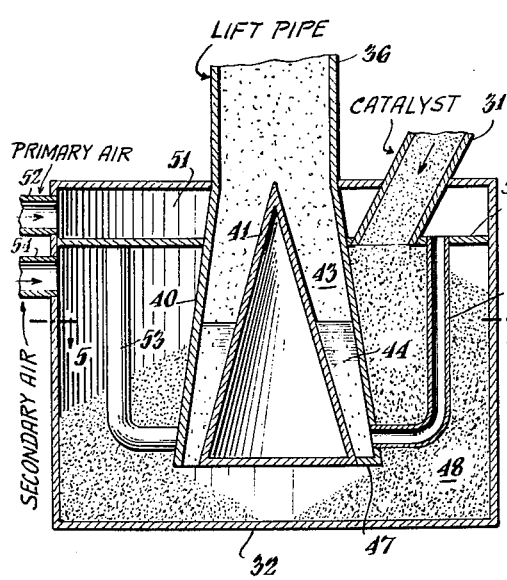
Figure 4 shows, in vertical section, an alternate lift pot design.

Figures 4 and 5 show an alternate embodiment of the invention. A partition 50 is located horizontally across the upper portion of the lift pot 32. This partition provides a gas manifold 51 between the partition and the top of the vessel 32. Lifting gas is introduced into the manifold 51 through the conduit 52. This gas is piped through conduits 53 depending from partition 50 to communicate with alternate passages 45 in the annular passage 43. The secondary gas enters the lift pot 32 through the conduit 54 and passes through the catalyst bed 48 to move catalyst into alternate passages 46. The mixing of the two gas streams in the annular passage 43 is as previously described with respect to Figures 2 and 3.

Figure 7:
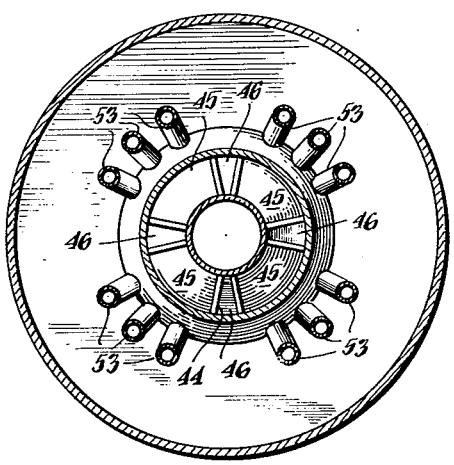
Figure 7 shows, in horizontal section, the lift pot of Figure 6 as seen on plane 7—7.
Figure 6:
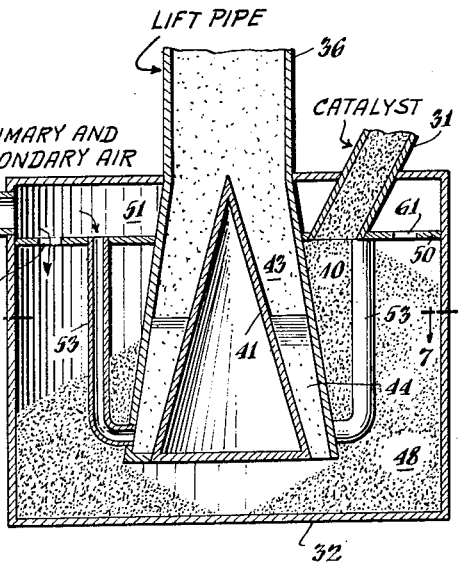
Figure 6 shows, in vertical section, an alternate lift pot design.

A further embodiment is shown on Figures 6 and 7. This design is somewhat similar to that shown on Figures 4 and 5 and also has a partition 50 located horizontally across the upper portion of the lift pot 32. This partition provides a manifold 51 between the partition and the top of the lift pot 32. The catalyst enters the lower section of the lift pot through the conduit 31 which extends through the manifold 51, and discharges below the horizontal partition plate 50, thereby providing a bed of catalyst around the lower end of the lift pipe 36. Primary and secondary lifting gas are introduced into the manifold 51 through the conduit 60. The major portion of this gas travels through depending conduits 53 into alternate passages 45, thereby providing the primary gas streams. The remainder of this gas passes through aperture 61 in the partition plate 50. This portion of the total gas serves as secondary gas and passes through the bed of catalyst 48, forcing this catalyst to enter the alternate passages 46. The mixing of the primary and secondary gas streams in the annular passage 43 is similar to that described with respect to the other embodiments of this invention.

While the invention has been described with respect to particular embodiments, it is not intended that the invention be limited to the apparatus depicted on the figures, but that the invention is to be construed broadly so as to cover alternate forms not described in detail hereinabove. The only limitations intended are those in the attached claims.

I claim:

1. Improved apparatus for introducing a granular contact material into the lower end of an upwardly-extending, open-ended lift pipe comprising in combination: a laterally confined continuous, annular passageway extending downwardly and laterally from the base of the lift pipe, at a steep angle with the horizontal, the radial thickness of the passageway decreasing gradually from top to bottom thereof, vertical partitions arranged within the passageway in a radial pattern, dividing the annular passageway into separated conduits, said partitions terminating at their upper ends at a level intermediate the top and bottom of the annular passageway, means for introducing lift gas into the base of alternate conduits and means for introducing lift gas and granular material into the remaining alternate conduits.

2. Improved apparatus for introducing a granular contact material into the lower end of an upwardly-extending, open-ended lift pipe comprising in combination: a laterally confined continuous, annular passageway extending downwardly and laterally from the base of the lift pipe, at a steep angle with the horizontal, the radial thickness of the passageway decreasing gradually from top to bottom thereof, vertical partitions arranged within the passageway in a radial pattern, dividing the annular passageway into separated conduits, said partitions terminating at their upper ends at a level intermediate the top and bottom of the annular passageway, floor members at the bottom of alternate conduits closing said conduits, means communicating with the lower portion of said conduits for introducing primary lift gas into said conduits, a lift tank located about the lower end of said lift pipe, said tank enclosing the passageway with the lower end of said passageway being terminated a substantial distance above the bottom of said lift tank, means for introducing secondary lift gas into said tank, for transferring granular material from said tank through the remaining alternate conduits and conduit means attached to said lift tank, adapted to continuously supply granular contact material to said tank.

3. The apparatus of claim 2 further characterized in that the upper ends of said partitions terminate at approximately the mid-point of the vertical distance from the bottom of said passageway to the top thereof.

4. The apparatus of claim 2 further characterized in that the passageway extends downwardly and laterally from the base of the lift pipe, at an angle of about 70–80 degrees with the horizontal.

5. The improved method of feeding a granular contact material into the lower end of an upwardly-extending, open-ended lift passage, for upward transfer therethrough in a stream of rapidly moving lift gas comprising: gravitating granular contact material about and below the lower end of the lift passage as a compact mass of solid particles, flowing a secondary lift gas through said mass of solid particles in sufficient amount to push solids into the lower end and upwardly through alternate members of a plurality of upwardly-extending open-ended passages, located within a continuous passage of annular horizontal cross-section, extending downwardly and outwardly from the base of the lift passage, the radial thickness of the continuous annular passage increasing gradually from bottom to top, the upwardly-extending passages terminating near the middle of the distance from the bottom to the top of the annular passage, introducing only primary lift gas into the remaining passages, in amount sufficient to elevate the granular particles through the lift passage, the secondary lift gas being only a minor portion of the total lift gas, whereby the lift gas and solids engage with minimum attrition of solids and erosion of metal.

6. Claim 5 further characterized in that the primary gas velocity at discharge from the primary gas passages is approximately 10–25 percent greater than the secondary gas velocity at discharge from the secondary gas passages.

References Cited in the file of this patent

UNITED STATES PATENTS

| | | |
|---|---|---|
| 2,695,815 | Bergstrom | Nov. 30, 1954 |
| 2,723,180 | Celani | Nov. 8, 1955 |
| 2,734,781 | Fowler | Feb. 14, 1956 |